United States Patent
Kawakami

(10) Patent No.: US 9,463,841 B2
(45) Date of Patent: Oct. 11, 2016

(54) BICYCLE BRAKE AND SHIFT OPERATING DEVICE

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 1339 days.

(21) Appl. No.: 12/904,460

(22) Filed: Oct. 14, 2010

(65) Prior Publication Data

US 2011/0185836 A1 Aug. 4, 2011

(30) Foreign Application Priority Data

Feb. 1, 2010 (JP) ................................. 2010-020336

(51) Int. Cl.
| B62K 25/00 | (2006.01) |
| B62K 23/06 | (2006.01) |
| B60T 7/10 | (2006.01) |
| B62M 25/04 | (2006.01) |

(52) U.S. Cl.
CPC ............... *B62K 23/06* (2013.01); *B60T 7/102* (2013.01); *B62M 25/04* (2013.01); *Y10T 74/20037* (2015.01)

(58) Field of Classification Search
CPC ...................................................... B62K 23/06
USPC ..................... 74/473.13, 502.2, 500.5, 501.6
IPC ....................................................... B62K 23/06
See application file for complete search history.

(56) References Cited

U.S. PATENT DOCUMENTS

| 4,100,820 A | * | 7/1978 | Evett ............................... 74/489 |
| 4,263,818 A | * | 4/1981 | Ozaki ......................... 74/473.13 |
| 5,257,683 A | * | 11/1993 | Romano ........................ 192/217 |
| 5,479,776 A | * | 1/1996 | Romano ....................... 74/502.2 |
| 5,921,138 A | * | 7/1999 | Kojima et al. ............. 74/473.13 |
| 6,758,129 B2 | * | 7/2004 | Dreischarf et al. ............... 92/84 |
| 6,991,081 B2 | * | 1/2006 | Uno et al. ..................... 192/217 |
| 7,007,785 B2 | * | 3/2006 | Uno et al. ..................... 192/217 |
| 7,017,440 B2 | * | 3/2006 | Campagnolo ................ 74/502.2 |

(Continued)

FOREIGN PATENT DOCUMENTS

| EP | 0 504 118 A1 | 9/1992 |
| EP | 1 997 724 A2 | 12/2008 |

(Continued)

OTHER PUBLICATIONS

European Search Report of corresponding EP Application No. 10 19 4659.8 dated Mar. 15, 2012.

*Primary Examiner* — William Kelleher
*Assistant Examiner* — Zakaria Elahmadi
(74) *Attorney, Agent, or Firm* — Global IP Counselors

(57) ABSTRACT

A bicycle brake and shift operating device is provided with a bicycle mounting bracket, a brake lever, a gear shifting mechanism, a first gear shift member and a connecting structure. The brake lever is pivotally connected to the mounting bracket about a first axis between a rest position and a brake operating position. The gear shifting mechanism is configured to operate a bicycle gear changing device to any one of a plurality of gear positions. The first gear shift member is pivotally mounted relative to the bicycle mounting bracket about a second axis. The first gear shift member is connected to the gear shifting mechanism to actuate the gear shifting mechanism. The connecting structure interconnects the brake lever and the first gear shift member together such that the first gear shift member pivots about the second axis in response to the brake lever being pivoted about the first axis.

15 Claims, 4 Drawing Sheets

(56) References Cited

U.S. PATENT DOCUMENTS

| | | | |
|---|---|---|---|
| 7,080,723 B2 * | 7/2006 | Uno et al. | 192/217 |
| 7,350,436 B2 * | 4/2008 | Fujii | 74/473.13 |
| 7,779,724 B2 * | 8/2010 | Fujii | 74/551.8 |
| 7,854,180 B2 * | 12/2010 | Tetsuka | 74/473.12 |
| 7,918,145 B1 * | 4/2011 | Calendrille, Jr. | 74/502.2 |
| 2007/0068318 A1 * | 3/2007 | Jordan et al. | 74/502.2 |
| 2007/0137361 A1 * | 6/2007 | Fujii | 74/473.13 |
| 2007/0137387 A1 * | 6/2007 | Dal Pra | 74/502.2 |
| 2007/0137388 A1 * | 6/2007 | Dal Pra | 74/502.2 |
| 2007/0204716 A1 * | 9/2007 | Dal Pra' | 74/502.2 |
| 2007/0227287 A1 * | 10/2007 | Righi et al. | 74/473.13 |
| 2008/0087126 A1 * | 4/2008 | Oda et al. | 74/473.13 |
| 2008/0168856 A1 * | 7/2008 | Tetsuka | 74/502.2 |
| 2008/0196537 A1 * | 8/2008 | Dal Pra' | 74/502.2 |
| 2008/0210041 A1 * | 9/2008 | Dal Pra' et al. | 74/502.2 |
| 2008/0210043 A1 * | 9/2008 | De Perini | 74/502.2 |
| 2008/0210045 A1 * | 9/2008 | De Perini et al. | 74/502.2 |
| 2008/0210046 A1 * | 9/2008 | De Perini | 74/502.2 |
| 2008/0295638 A1 * | 12/2008 | Miki et al. | 74/502.2 |
| 2008/0314183 A1 * | 12/2008 | Miki | 74/473.13 |
| 2008/0314184 A1 * | 12/2008 | Miki | 74/473.14 |
| 2008/0314191 A1 * | 12/2008 | Miki et al. | 74/502.2 |
| 2009/0031846 A1 * | 2/2009 | Dal Pra' et al. | 74/502.2 |
| 2009/0038427 A1 * | 2/2009 | Watarai | 74/473.13 |
| 2009/0084221 A1 * | 4/2009 | Liu et al. | 74/502.2 |
| 2009/0133526 A1 * | 5/2009 | Dal Pra et al. | 74/502.2 |
| 2009/0188340 A1 * | 7/2009 | Tetsuka et al. | 74/473.13 |
| 2009/0217780 A1 * | 9/2009 | Evett | 74/473.13 |
| 2010/0083788 A1 * | 4/2010 | Jordan et al. | 74/502.2 |
| 2011/0079103 A1 * | 4/2011 | Kususe et al. | 74/502.2 |
| 2011/0138961 A1 * | 6/2011 | Dal Pra | 74/502.2 |
| 2011/0167949 A1 * | 7/2011 | Tsai | 74/502.2 |
| 2012/0048054 A1 * | 3/2012 | Miki et al. | 74/502.2 |

FOREIGN PATENT DOCUMENTS

| | | | |
|---|---|---|---|
| EP | 1997724 A2 * | 12/2008 | B62K 23/06 |
| WO | WO-2005/044656 A1 | 5/2005 | |
| WO | WO 2005044656 A1 * | 5/2005 | B62K 23/06 |

* cited by examiner

BICYCLE BRAKE AND SHIFT OPERATING DEVICE

CROSS-REFERENCE TO RELATED APPLICATIONS

This application claims priority under 35 U.S.C. §119 to Japanese Patent Application No. 2010-020336, filed Feb. 1, 2010. The entire disclosure of Japanese Patent Application No. 2010-020336 is hereby incorporated herein by reference.

BACKGROUND

1. Field of the Invention

This invention generally relates to a bicycle brake and shift operating device for operating a bicycle component. More specifically, the present invention relates to a bicycle brake and shift operating device configured to operate a brake device and a gear changing device of a bicycle.

2. Background Information

A known conventional bicycle brake and shift operating device has a gear shift member arranged rearward of a brake lever (e.g., U.S. Pat. No. 5,257,683). The conventional bicycle brake and shift operating device is equipped with a bracket configured to be fastened to a drop handlebar, a brake lever attached to the mounting bracket such that it can pivot about a first axis, a winding lever (example of a first gear shift member) arranged rearward of the brake lever, a release lever (example of a second gear shift member), and a gear shifting mechanism. The winding lever is connected to the gear shifting mechanism such that it can pivot about a third axis that is not parallel to the first axis in order to operate a winding body provided in the gear shifting mechanism in a winding direction. When the brake lever is pivoted rearward from a rest position to a brake operating position, the winding lever contacts the brake lever and is pushed by the brake lever so as to turn about a second axis. When the winding lever is pivoted about the third axis, it actuates the gear shifting mechanism such that a gear change operation occurs. The release lever is pivotally connected to a rear face portion of the gear shifting mechanism and arranged to protrude in an inward direction of the mounting bracket. A force applying member applies a force against the first gear shift member in a return direction (in a forward pivot direction).

SUMMARY

It has been discovered that with the conventional structure described above, when the brake lever is operated, the first gear shift member arranged rearward of the brake lever is pushed by the brake lever such that it pivots rearward. If the first gear shift member is operated about the third axis to change gears while the brake lever is being operated, then the first gear shift member will separate from the brake lever such that it no longer touches against the brake lever. When this occurs, the gear change operation will feel odd to a rider.

In view of the state of the known technology, one aspect of the present disclosure is to provide a bicycle brake and shift operating device in which such an odd feeling does not occur when changing gears while the brake lever is being operated.

In accordance with a first aspect of this disclosure, a bicycle brake and shift operating device is provided that basically comprises a bicycle mounting bracket, a brake lever, a gear shifting mechanism, a first gear shift member and a connecting structure. The brake lever is pivotally connected to the mounting bracket about a first axis between a rest position and a brake operating position. The gear shifting mechanism is attached to the mounting bracket and is configured to operate a bicycle gear changing device to any one of a plurality of gear positions. The first gear shift member is pivotally mounted relative to the bicycle mounting bracket about a second axis. The first gear shift member is connected to the gear shifting mechanism to actuate the gear shifting mechanism. The connecting structure interconnects the brake lever and the first gear shift member together such that the first gear shift member pivots about the second axis in response to the brake lever being pivoted about the first axis.

With this brake and gear changing device operating apparatus, the brake lever pivots about the first axis when the brake lever is operated from the rest position to the brake operating position. Due to the connecting structure, the first gear shift member (which is connected to the brake lever) pivots about the second axis in coordination with operation of the brake lever. Thus, since the brake lever and the first gear shift member are connected together by the connecting structure, the brake lever and the first gear shift member can be separated from each other. As a result, a gear change operation is less likely to feel odd to a rider.

In accordance with a second aspect of this disclosure, the bicycle brake and shift operating device according to the first aspect is provided such that the second axis is arranged to be substantially parallel to the first axis. With this aspect, since the pivot axis of the brake lever and the pivot axis of the first gear shift member are arranged substantially parallel to each other, the first gear shift member can be pivoted readily in coordination with a pivot movement of the brake lever.

In accordance with a third aspect of this disclosure, the bicycle brake and shift operating device according to the first aspect or second aspect is provided such that the first gear shift member is configured to actuate the gear shifting mechanism by pivoting about a third axis that is not parallel to the first axis. Since a gear change operation can be accomplished by turning the first gear shift member about a third axis not parallel to the first axis, it is more difficult for a brake operation and a gear change operation to interfere with each other. Therefore, the brake operation and the gear change operation can be accomplished more reliably.

In accordance with a fourth aspect of this disclosure, the bicycle brake and shift operating device according to any one of the first to third aspects is provided such that the brake lever and the first gear shift member are arranged with respect to each other in a non-contacting relationship such that the brake lever and the first gear shift member are physically separated from each other with the brake lever in both the rest position and during a pivot operation of the brake lever from the rest position to the brake operating position. With this aspect, a gear change operation is less likely to feel odd to a rider because the brake lever and the first gear shift member are always separated.

In accordance with a fifth aspect of this disclosure, the bicycle brake and shift operating device according to the third or fourth aspect is provided such that the connecting structure includes a link member with a first end coupled to the first gear shift member and a second end movably coupled to the brake lever, the link member, the mounting bracket, the brake lever and the first gear shift member forming a four-bar linkage. With this aspect, when the brake lever is operated, the brake lever and the first gear shift member pivot in a parallel manner due to the four-bar linkage.

In accordance with a sixth aspect of this disclosure, the bicycle brake and shift operating device according to the fifth aspect is provided such that the first end of the link member includes a ball joint and the second end of the link member includes a pivot joint, the ball joint being arranged on the third axis at least while the brake lever is arranged in the rest position, the ball joint being connected to the first gear shift member at a position different from the second axis, and the pivot joint being connected to the brake lever. With this aspect, since the ball joint is arranged on the third axis at least when the brake lever is arranged in the rest position, the first gear shift member can be turned about the third axis to execute a gear change operation at least when the brake lever is arranged in the rest position. Furthermore, by configuring the bicycle brake and shift operating device such that the ball joint is arranged on the third axis even when the brake lever is in the brake operating position, the first gear shift member can be used to execute a gear change operation both when the brake lever is in the rest position and when the brake lever is in the brake operating position.

In accordance with a seventh aspect of this disclosure, the bicycle brake and shift operating device according to any one of the first to sixth aspects is provided such that the gear shifting mechanism includes a winding body configured to turn such that the winding body selectively winds and releases a gear shift cable attached to the winding body, and the first gear shift member is configured to move the winding body in a winding direction of the gear shifting mechanism. With this aspect, the first gear shift member can be used to operate the gear changing device to any one of a plurality of gear positions by positioning the winding body in sequential steps in a winding direction of the gear shifting mechanism.

In accordance with an eighth aspect of this disclosure, the bicycle brake and shift operating device according to the seventh aspect is further comprises a second gear shift member connected to the gear shifting mechanism to move the winding body in a release direction, which is opposite to the winding direction. With this aspect, the second gear shift member can be used to operate the gear changing device to any one of a plurality of gear positions by positioning the winding body in sequential steps in a release direction. As a result, gear change operations can be performed in two directions.

These and other objects, features, aspects and advantages of the bicycle brake and shift operating device will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
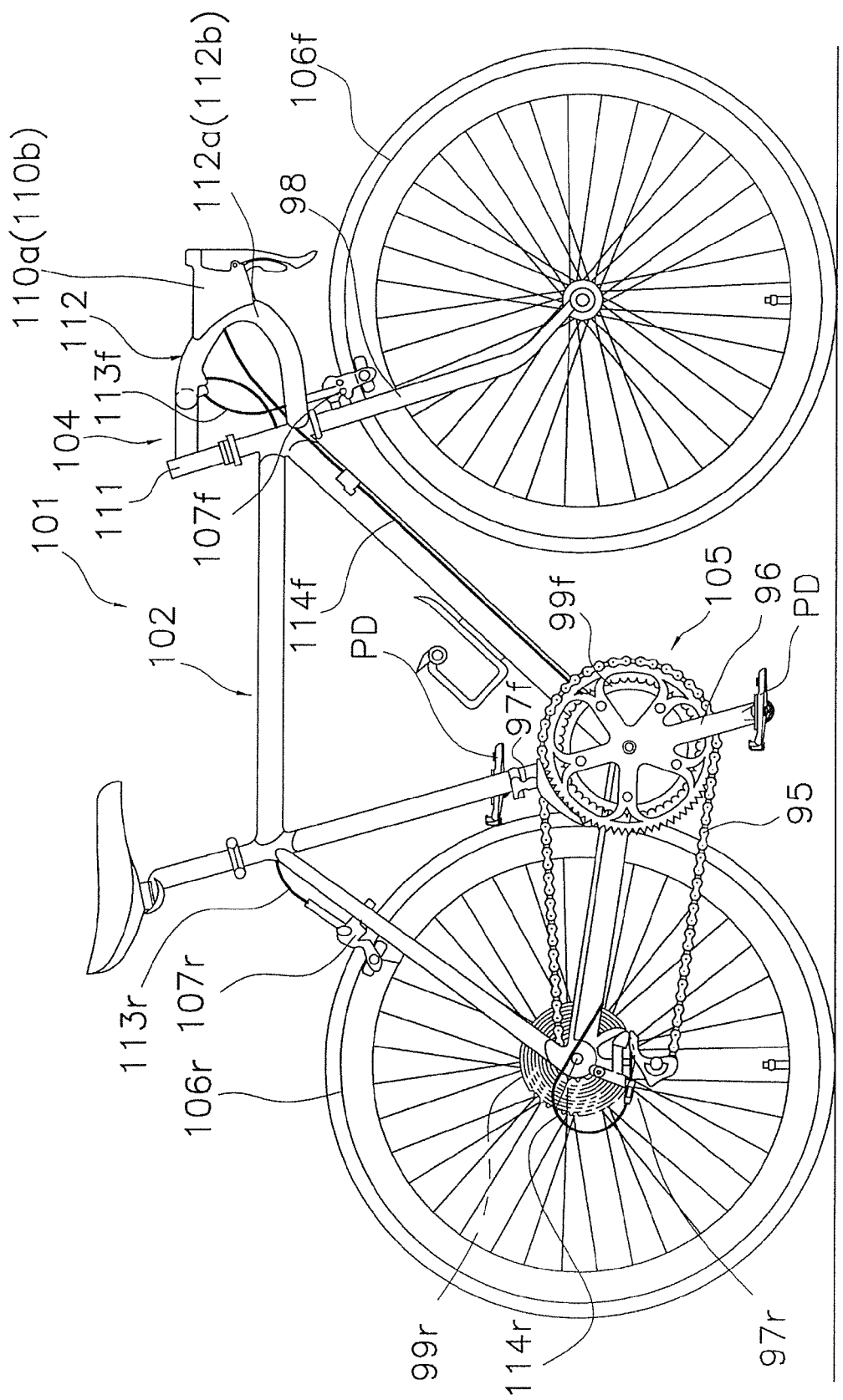
FIG. 1 is a side elevational view of a bicycle that is equipped with a pair of bicycle brake and shift operating devices in accordance with one illustrated embodiment.

Referring initially to FIG. 1, a bicycle 101 that is equipped in accordance with a first embodiment. The bicycle 101 is a "road racer" (racing style road bike). The bicycle 101 has a main support structure that basically includes a front fork 98 and a diamond-shaped frame 102 with the front fork 98 coupled to the frame 102 in a rotatable manner. A handlebar unit 104 is fastened to an upper end of the front fork 98 for steering the bicycle 101. A drive unit 105 is also operatively coupled to the frame 102. A front wheel 106$f$ is mounted to the front fork 98 in a conventional manner. A rear wheel 106$r$ is mounted to a rear portion of the frame 102 in a conventional manner. The drive unit 105 basically includes a chain 95, a crank 96 on which pedals PD are mounted, a front derailleur 97$f$ (e.g., a gear changing device), a rear derailleur 97$r$ (e.g., a gear changing device), a front sprocket cluster 99$f$, and a rear sprocket cluster 99$r$. The bicycle 101 also includes a front brake device 107$f$, a rear brake device 107$r$, and a pair (right and left) bicycle brake and shift operating devices 110$a$ and 110$b$. The bicycle brake and shift operating devices 110$a$ and 110$b$ are configured to control the rear and front derailleurs 97$r$ and 97$f$, the rear and front brake devices 107$r$ and 107$f$, respectively. The rear and front derailleurs 97$r$ and 97$f$ are examples of gear changing devices in accordance with one embodiment.

As shown in FIG. 1, the handlebar unit 104 includes a handlebar stem 111 and a handlebar 112 that is fitted into and fastened to the upper end of the handlebar stem 111. The handlebar stem 111 is fitted into and fastened to an upper part of the front fork 98. The handlebar 112 is a drop-type handlebar that has a center horizontal section, a U-shaped right curved section 112$a$ and a U-shaped left curved section left 112$b$. The right and left curved sections 112$a$ and 112$b$ are located on both ends of the center horizontal section of the handlebar 112. The right and left curved sections 112$a$ and 112$b$ are arranged such that the curved portions protrude in the forward direction from the center horizontal section of the handlebar 112. The bicycle brake and shift operating device 110$a$ is arranged on the right-hand end as the bicycle 101 as viewed from the rear the bicycle 101. The bicycle brake and shift operating device 110$a$ operates the front brake device 107$f$ and the rear derailleur 97$r$. The bicycle brake and shift operating device 110$b$ is arranged on the left-hand end as the bicycle 101 as viewed from the rear the bicycle 101. The bicycle brake and shift operating device 110$b$ operates the rear brake device 107$r$ and the front derailleur 97$f$.

Figure 2:
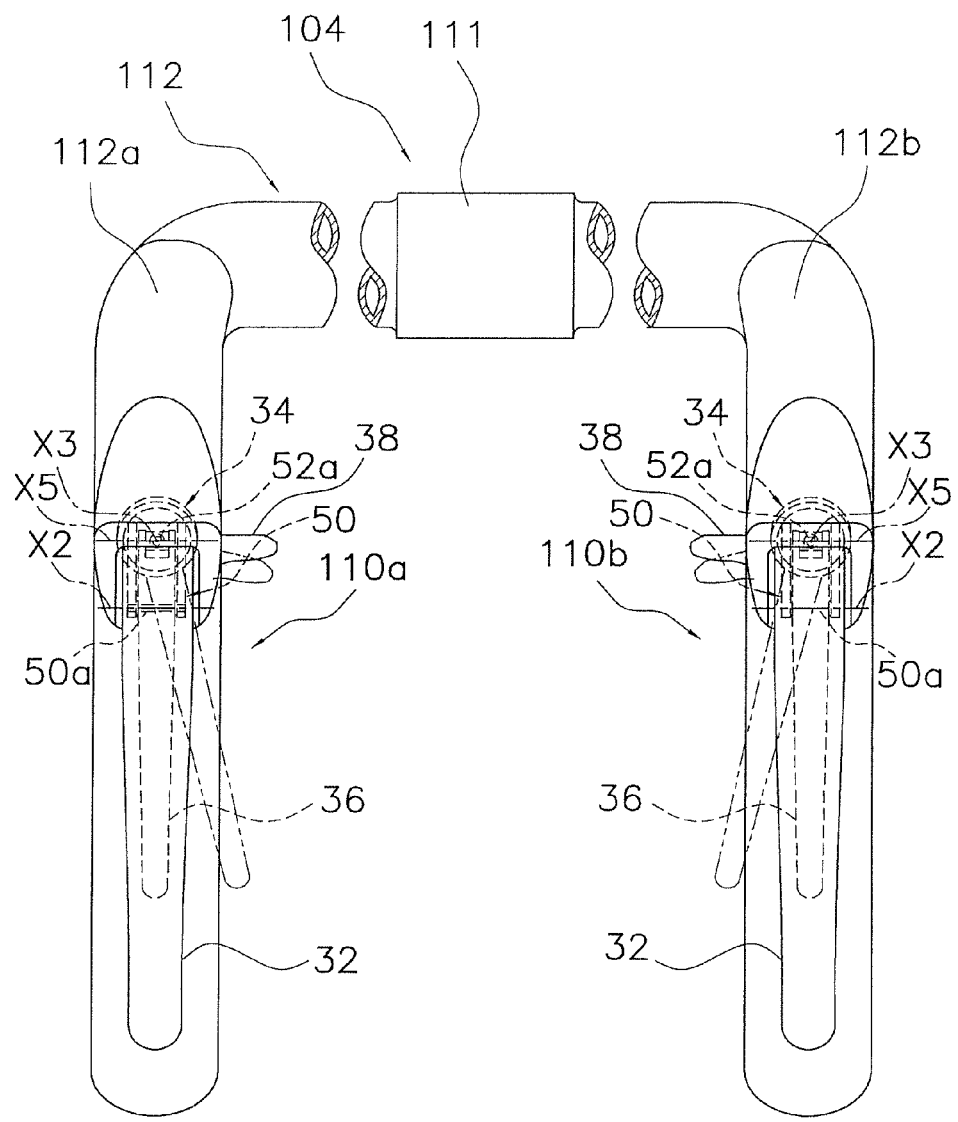
FIG. 2 is a front elevational view of a handlebar section on which the bicycle brake and shift operating devices according to the illustrated embodiment is arranged.

As shown in FIG. 2, the bicycle brake and shift operating device 110$a$ is attached to the right curved section 112$a$ of the handlebar 112 (which appears on the left as viewed from in front of the bicycle 101). Also as shown in FIG. 2, the bicycle brake and shift operating device 110$b$ is attached to the left curved section 112$b$ of the handlebar 112 (which appears on the right as viewed from in front of the bicycle 101).

As used herein, the following directional terms "vertical," "upper," "lower," "longitudinal," "front," "rear," "left," "right," "forward", "rearward", "upward", "downward", "vertical", "horizontal", "above", "below" and "transverse" as well as any other similar directional terms refer to those directions of the bicycle 101 equipped with the bicycle brake and shift operating devices 110*a* and 110*b* on a flat horizontal surface. The directional terms "left" and "right" also refer to the left and right sides or left and right directions of the bicycle when the bicycle 101 is viewed from the rear. Therefore, in FIG. 2, the nominal left and right directions are opposite to what is shown in FIG. 2 because FIG. 2 shows the handlebar unit 104 as viewed from the front. Moreover, as used herein, the phrase "about an axis" and similar phrases regarding relative pivotal movement of one part relative to another part about an axis refer to part pivoting with a center of pivotal movement defined by the axis. For example, if a first member is pivotally mounted relative to a second member about an axis, then this means that the pivotal movement of the first member has a center pivotal movement defined by the axis.

As shown in FIG. 1, the right bicycle brake and shift operating device 110*a* is connected to the front brake device 107*f* with a Bowden type front brake cable 113*f*, while the left bicycle brake and shift operating device 110*b* is connected to the rear brake device 107*r* with a Bowden type rear brake cable 113*r*. Additionally, the right bicycle brake and shift operating device 110*a* is connected to the rear derailleur 97*r* with a Bowden type rear gear shift cable 114*r*, while the left brake operating gear shifting unit 110*b* is connected to the front derailleur 97*f* with a Bowden type front gear shift cable 114*f*.

The front sprocket cluster 99*f* has a plurality of (e.g., two or three) sprockets that are arranged along the axial direction of a crank axle and have different tooth counts. The rear sprocket cluster 99*r* has a plurality of (e.g., three to ten) sprockets that are arranged along the axial direction of a hub axle of the rear wheel 106*r*, and each sprocket has a different tooth count.

In the front sprocket cluster 99*f*, a low gear sprocket is located in an inner position and has a smaller number of teeth than a top gear sprocket located in an outer position. Thus, the tooth counts of the sprockets in the front sprocket cluster 99*f* increase sequentially as one moves from the inside toward the outside of the front sprocket cluster 99*f*. The sprockets of the rear sprocket cluster 99*r* are arranged such that the innermost sprocket is a low sprocket having the most number of teeth and the outermost sprocket a top sprocket having the smallest number of teeth. Thus, the tooth counts of the sprockets in the rear sprocket cluster 99*r* decrease sequentially as one moves from the inside toward the outside of the rear sprocket cluster 99*r*.

The bicycle brake and shift operating devices 110*a* and 110*b* are configured and arranged to be mirror images of each other, the only difference being the number of gears they are configured to shift. The following explanation will focus mainly on the bicycle brake and shift operating device 110*a* that is normally arranged on the right side of the drop-type handlebar 112.

Figure 3:
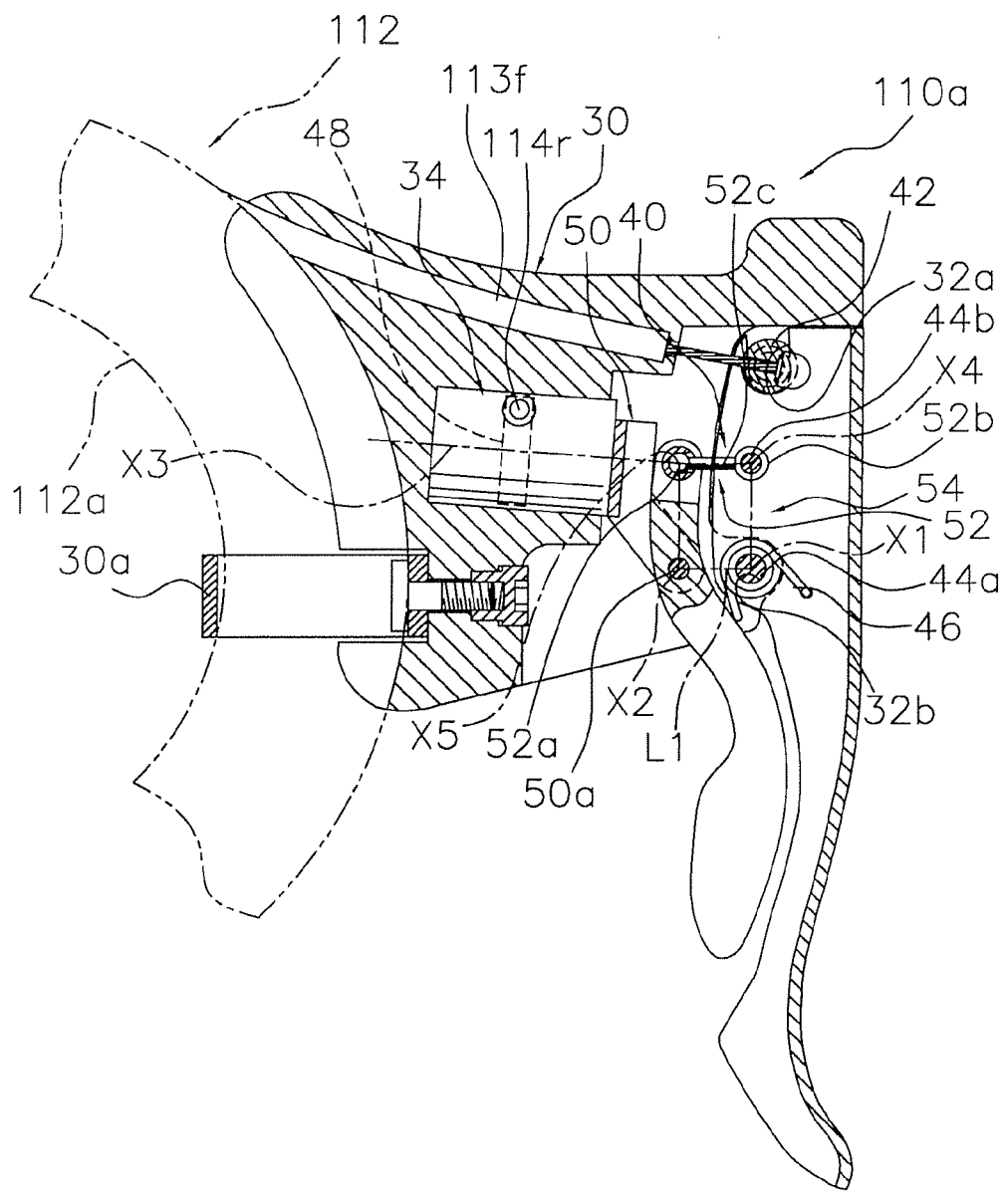
FIG. 3 is an enlarged cross sectional view of one of the bicycle brake and shift operating devices with the brake lever in the rest position.

As shown in FIGS. 2 and 3, the right bicycle brake and shift operating device 110*a* is mounted to the curved section 112*a* of the handlebar 112 of the bicycle 101. The right bicycle brake and shift operating device 110*a* basically includes a bicycle mounting bracket 30, a brake lever 32, a gear shifting mechanism 34, a winding lever 36, a release lever 38 and a connecting structure 40. As explained below, with the bicycle brake and shift operating device 110*a*, since the brake lever 32 and the winding lever 36 are connected together by the connecting structure 40, the brake lever 32 and the winding lever 36 can remain separated from each other. As a result, an odd feeling does not occur to the rider when changing gears while the brake lever 32 is being operated.

The mounting bracket 30 is fastened to the right curved section 112*a* of the handlebar 112. In particular, the mounting bracket 30 has a fastening section 30*a* that is configured to be fastened to the right curved section 112*a* of the handlebar 112. The mounting bracket 30 is a conventional tube-type clamp that is often used in road style shifters.

Figure 4:
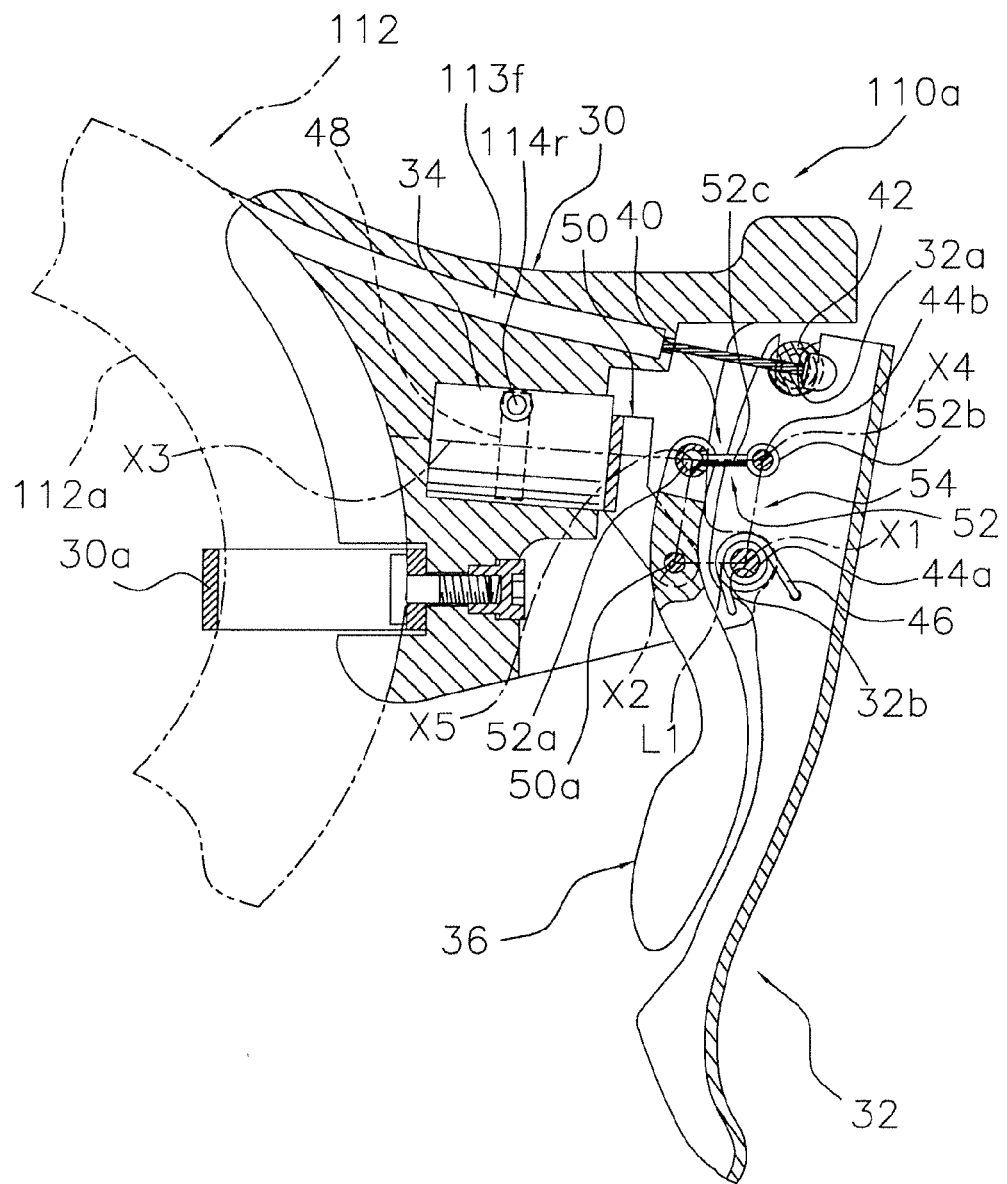
FIG. 4 is an enlarged cross sectional view of the bicycle brake and shift operating device illustrated in FIG. 3 with the brake lever in the brake operating position.

As shown in FIGS. 3 and 4, the brake lever 32 is pivotally attached to the mounting bracket 30 by a first pivot shaft 44*a*. The first pivot shaft 44*a* is arranged on the mounting bracket 30 such that the first pivot shaft 44*a* is aligned with a first axis X1. Thus, the brake lever 32 is pivots about the first axis X1. A tip end (lower end) portion of the brake lever 32 is a portion used for brake operation, and is curved slightly frontward. The first axis X1 is arranged below a base end (upper end) of the brake lever 32. The first axis X1 is oriented in a left-to-right direction such that the brake lever 32 can pivot frontward and rearward along a braking plane. In particular, the brake lever 32 pivots between a rest position shown in FIG. 3 and a brake operating position shown in FIG. 4. In the brake operating position, brake shoes of the front brake device 107*f* are pressed against both side faces of a rim of the front wheel 106*f*.

As shown in FIGS. 3 and 4, the brake lever 32 has a brake cable mounting groove 32*a* that is formed in a base end portion of the brake lever 32. A cable stop portion 42 is detachably installed in the mounting groove 32*a* to secure a tip end of the inner wire of the front brake cable 113*f* to the brake lever 32. A support hole 32*b* is formed below the mounting groove 32*a*. The support hole 32*b* supports the brake lever 32 on the first pivot shaft 44*a*. A return spring 46 is wound onto the first pivot shaft 44*a*. The return spring 46 has is a coil torsion spring. A first free end of the return spring 46 is secured in a hole in the brake lever 32, while a second free end of the return spring 46 is secured in a hole in the mounting bracket 30. The brake lever 32 is biased toward the rest position by the return spring 46.

The gear shifting mechanism 34 is fixedly attached to the mounting bracket 30. The gear shifting mechanism 34 is configured to operate the rear derailleur 97*r* to any one of a plurality of gear positions by selectively pulling and releasing the rear gear shift cable 114*r* in response to operation of the winding lever 36 and the release lever 38. The gear shifting mechanism 34 is arranged along a third axis X3 that is not parallel to the first axis X1. The gear shifting mechanism 34 has a winding body 48 for winding in and releasing the inner wire of the rear gear shift cable 114*r*. The winding body 48 is arranged such that it can turn about the third axis X3. The winding body 48 winds the rear gear shift cable 114*r* upon its outer peripheral edge when the winding body 48 rotates in one direction and releases the rear gear shift cable 114*r* when the winding body 48 rotates in the other direction. The winding body 48 is biased in a reel-out direction (example of a release direction) by a spring member that is not shown in the figures. The gear shifting mechanism 34 has a positioning mechanism (not shown) configured to position the winding body 48 into a position corresponding one of the plurality of gears each time the winding lever 36 or the release lever 38 is operated once. Since the gear shifting mechanisms with a winding body are well known, the gear shifting mechanism 34 will not be shown in detail for the sake of brevity. Moreover, the gear shifting mechanism 34 can be any suitable gear shifting mechanism as needed and/or desired.

The winding lever 36 is an operating member for operating the gear shifting mechanism 34. The winding lever 36 is an example of either a first gear shift member or a second gear shift member depending on whether release lever 38 constitutes either the first gear shift member or the second gear shift member. The winding lever 36 is connected to the gear shifting mechanism 34 such that the winding lever 36 can pivot about a second axis X2 that is substantially parallel to the first axis X1. The second axis X2 is located slightly below a base end of the winding lever 36. A tip end portion of the winding lever 36 is used for executing a gear shift operation. The tip end portion of the winding lever 36 is wider in a longitudinal direction of the bicycle (front to rear direction) than other portions. A support bracket 50 is provided on a frontward portion of the gear shifting mechanism 34. The support bracket 50 pivotal supports the winding lever 36 such that the winding lever 36 can pivot about the second axis X2. A pivot support shaft 50a is arranged on a tip end of the support bracket 50 so as to be aligned along the second axis X2. The winding lever 36 is attached to the pivot support shaft 50a such that the winding lever 36 can pivot about the second axis X2. The support bracket 50 can turn about the third axis X3, and the winding lever 36 can turn about the third axis X3 within a prescribed angular range between an operation start position indicated in FIG. 2 with a broken line and an operation end position indicated with a double-dot chain line. When the winding lever 36 is operated once by moving it from the operation start position to the operation end position in a direction depicted as counterclockwise in FIG. 2, the winding body 48 is moved one step in a wind-in direction to a position corresponding to an adjacent gear. As a result, for example, the rear derailleur 97r is upshifted or downshifted by one gear. The base end of the winding lever 36 is divided in two sections with the connecting structure 40 connected in-between the two sections.

As shown in FIG. 2, the release lever 38 is arranged on the gear shifting mechanism 34 in a position rearward of the winding lever 36 and such that the release lever 38 protrudes in an inward direction. The release lever 38 is an example of either of a second gear shift member or a first gear shift member depending on whether winding lever 36 constitutes either the first gear shift member or the second gear shift member. In the illustrated embodiment, for example, the release lever 38 is connected to the gear shifting mechanism 34 such that the release lever 38 can pivot freely about the third axis X3. The release lever 38 can pivot about the third axis X3 within a prescribed angular range between an operation start position indicated in FIG. 2 with a solid line and an operation end position indicated with a double-dot chain line. When the release lever 38 is operated once from the operation start position to the operation end position in a counterclockwise direction in FIG. 2, the winding body 48 is moved one step in a reel-out direction to a position corresponding to an adjacent gear. As a result, for example, the rear derailleur 97r is either upshifted or downshifted by one gear.

The connecting structure 40 connects the brake lever 32 and the winding lever 36 together such that upon pivoting the brake lever 32 about the first axis X1, the winding lever 36 pivots about the second axis X2 in a coordinated manner. In the illustrated embodiment, the brake lever 32 and the winding lever 36 (e.g., a first gear shift member) are arranged with respect to each other in a non-contacting relationship by the connecting structure 40. In this way, the brake lever 32 and the winding lever 36 are physically separated from each other with the brake lever 32 in the rest position and during a pivot operation of the brake lever 32 from the rest position to the brake operating position.

In the illustrated embodiment, the connecting structure 40 has a link member 52 that serves to connect the brake lever 32 and the winding lever 36 together. The link member 52 has a first end movably connected to a base end of the winding lever 36 by a ball joint 52a. The link member 52 has a second end movably connected to a base end of the brake lever 32 by a pivot joint 52b. The ball joint 52a and the pivot joint 52b are connected together with a rod-shaped member 52c. The rod-shaped member 52c of the link member 52 is arranged substantially parallel to a line segment L1 joining the first axis X1 and the second axis X2. The pivot joint 52b of the link member 52 pivots relative to the brake lever 32 about a fourth axis X4. The ball joint 52a of the link member 52 pivots relative to the winding lever 36 about a fifth axis X5 that intersects perpendicularly with the third axis X3. The link member 52, the mounting bracket 30, the brake lever 32 and the winding lever 36 form a four-bar linkage 54. The first axis X1, the second axis X2, the fourth axis X4 and the fifth axis X5 are all substantially parallel to each other such that axes X1, X2, X4 and X5 define the four pivot points of the four-bar linkage 54.

The base end of the winding lever 36 is divided in two with the ball joint 52a of the link member 52 being connected in-between the two sections of the base end of the winding lever 36. The ball joint 52a is configured and arranged such that the winding lever 36 can pivot about both the third axis X3 and the fifth axis X5. In the illustrated embodiment, by using the four-bar linkage 54, the ball joint 52a remains substantially close to the third axis X3 during a brake operation of the brake lever 32. In other words, the ball joint 52a enables the winding lever 36 to pivot relative to the link member 52 about the third axis X3 and enables the winding lever 36 and the link member 52 to pivot relative to each other about the fifth axis X5. When the brake lever 32 is arranged in the rest position shown in FIG. 3, a center of the ball joint 52a is arranged on the third axis X3. As a result, when the brake lever 32 is in the rest position, the winding lever 36 can be turned about the third axis X3. In this embodiment, even when the brake lever 32 is arranged in the brake operating position shown in FIG. 4, the center of the ball joint 52a is arranged on the third axis X3. As a result, even when the brake lever 32 is in the brake operating position, the winding lever 36 can be turned about the third axis X3.

The pivot joint 52b pivotally connects the link member 52 to the brake lever 32 such that the brake lever 32 can turn relative to the link member 52 about the fourth axis X4. In particular, the pivot joint 52b is attached to the brake lever 32 by a second pivot shaft 44b that is arranged on the brake lever 32. In other words, the pivot joint 52b is connected to the brake lever 32 by the second pivot shaft 44b such that the brake lever 32 can pivot freely about the fourth axis X4. The second pivot shaft 44b is oriented along the fourth axis X4.

When a rider operates (squeezes) the brake lever 32 of the right bicycle brake and shift operating device 110a, the brake lever 32 pivots clockwise from the rest position as shown in FIG. 3 to the brake operating position as shown in FIG. 4. This movement of the brake lever 32 pulls the inner wire of the front brake cable 113f. This pulling of the inner wire of the front brake cable 113f causes the brake shoes of the front brake device 107f to press against both sides of the rim of the front wheel 106f. Simultaneously, the connecting structure 40 functions such that the base end of the winding lever 36 is pulled by the brake lever 32 through the link member 52. This pulling of the winding lever 36 by the brake lever 32 via the link member 52 causes the winding lever 36 to pivot about the second axis X2 in a clockwise direction from the perspective of FIG. 3. Since the connecting structure 40 employs the four-bar linkage 54, the brake lever 32 and the winding lever 36 do not contact each other and remain separated by a gap as the brake lever 32 is pivoted from the rest position to the brake operating position.

Meanwhile, if the winding lever 36 is operated from the operation start position to the operation end position while the brake lever 32 is in either the rest position or the braking position, then the center of the ball joint 52a will be arranged on the third axis X3. Consequently, the brake lever 36 will be turned about the third axis X3 (in a counterclockwise direction from the perspective of FIG. 2) by the ball joint 52a. As a result, the winding body 48 will rotate by an amount corresponding to changing gears by one gear position and the inner wire of the rear gear shift cable 114r will be pulled by an amount corresponding to changing gears by one gear position, thereby causing the rear derailleur 97r to downshift or upshift by one gear.

With the bicycle brake and shift operating devices 110a and 110b of the illustrated embodiment, the brake lever 32 pivots about the first axis X1 when the brake lever 32 is operated from the rest position to the brake operating position. Meanwhile, the winding lever 36 is connected to the brake lever 32 by the connecting structure 40 such that the winding lever 36 pivots about the second axis X2 in coordination with the brake lever 32. Furthermore, since the brake lever 32 and the winding lever 36 are connected together by the connecting structure 40, the brake lever 32 and the winding lever 36 can be separated from each other. As a result, a gear change operation is less likely to feel odd to a rider.

As mentioned above, in the bicycle brake and shift operating devices 110a and 110b, the second axis X2 is substantially parallel to the first axis X1. In such a case, since the first pivot shaft 44a of the brake lever 32 and the pivot support shaft 50a of the winding lever 36 are substantially parallel, the winding lever 36 can be pivoted readily in coordination with pivoting of the brake lever 32.

Also as mentioned above, in the bicycle brake and shift operating devices 110a and 110b, the gear shifting mechanism 34 is arranged to be aligned along the third axis X3 that is not parallel to the first axis X1. In this way, the winding lever 36 is connected to the gear shifting mechanism 34 such that the winding lever 36 can turn about the third axis X3. Thus, the gear shifting mechanism 34 operates by turning about the third axis X3. Since a gear change operation can be accomplished by turning about the third axis X3 oriented in a different direction than the first axis X1, it is more difficult for the brake operation and the gear change operation to interfere with each other. Therefore, the brake operation and the gear change operation can be accomplished more reliably with the bicycle brake and shift operating devices 110a and 110b.

With the bicycle brake and shift operating devices 110a and 110b, the brake lever 32 and the winding lever 36 are arranged separated from each other in the rest position and during operation (pivoting) from the rest position to the brake operating position. As a result, a gear change operation is less likely to feel odd to a rider because the brake lever 32 and the winding lever 36 are always separated.

With the bicycle brake and shift operating devices 110a and 110b, the connecting structure 40 has the four-bar linkage 54 that includes the link member 52 with the ball joint 52a on one end and the pivot joint 52b on another end. The ball joint 52a is arranged on the third axis X3 at least when the brake lever 32 is arranged in the rest position and connected to the winding lever 36 at a position different from the second axis X2, and the pivot joint 52b is connected to the brake lever 32. Thus, when the brake lever 32 is operated, the brake lever 32 and the winding lever 36 pivot in a parallel manner due to the four-bar linkage 54. Also, since the ball joint 52a is arranged on the third axis X3 at least when the brake lever 32 is arranged in the rest position, the winding lever 36 can be turned about the third axis X3 to execute a gear change operation at least when the brake lever 32 is arranged in the rest position. Furthermore, by contriving the apparatus such that the ball joint 52a is arranged on the third axis X3 even when the brake lever 32 is in the brake operating position, the winding lever 36 can be used to execute a gear change operation both when the brake lever is in the rest position and when the brake lever is in the brake operating position.

With the bicycle brake and shift operating devices 110a and 110b, the gear shifting mechanism 34 has the winding body 48 that can wind and release the rear gear shift cable 114r or the front gear shift cable 114f. Also the winding lever 36 moves the winding body 48 in the winding direction. As a result, the winding lever 36 can be used to operate a derailleur to any one of a plurality of gear positions by positioning the winding body 48 in sequential steps in a winding direction.

Each of the bicycle brake and shift operating devices 110a and 110b is further provided with the release lever 38 for moving the winding body 48 in a release direction. As a result, the release lever 38 can be used to operate a derailleur to any one of a plurality of gear positions by positioning the winding body 48 in sequential steps in a release direction. As a result, gear change operations can be performed in two directions.

While only selected embodiments have been chosen to illustrate a bicycle brake and shift operating device, it will be apparent to those skilled in the art from this disclosure that various changes and modifications can be made herein without departing from the scope of the invention as defined in the appended claims. For example, the illustrated embodiment discloses the bicycle brake and shift operating devices 110a and 110b configured to be attached to the drop handlebar 112 of a road bike. However, the bicycle brake and shift operating devices 110a and 110b are not limited to such an application. Rather, the bicycle brake and shift operating devices 110a and 110b can be configured to be attached to be attached to a flat handlebar. Also although in the illustrated embodiment the winding lever 36 serves as a first gear shift member to move in coordination with the brake lever, the bicycle brake and shift operating devices 110a and 110b are not limited to such an arrangement. It is also acceptable for the bicycle brake and shift operating devices 110a and 110b to be reconfigures such that brake lever 32 is connected to a release lever, which serves as a first gear shift member and moves in coordination with the brake lever 32.

In the illustrated embodiment, the winding lever 36 of the bicycle brake and shift operating devices 110a and 110b can be operated to shift gears both while the brake lever 32 is in the rest position and while the brake lever 32 is in an brake operating position. However, the bicycle brake and shift operating devices 110a and 110b are not limited to such a feature. For example, the bicycle brake and shift operating devices 110a and 110b can be reconfigured such that the ball joint 52a is not arranged on the third axis X3 when the brake lever 32 is in the brake operating position. This alternative arrangement is acceptable because a gear shift operation is seldom executed while the brake lever 32 is in the brake operating position.

Moreover, while in the illustrated embodiment, a ball joint is used on the link member so that both turning about the third axis and pivoting about the second axis can be accomplished. However, the bicycle brake and shift operating devices 110a and 110b are not limited to using a ball joint. For example, the bicycle brake and shift operating devices 110a and 110b can be reconfigured such that a universal joint or the like is used instead of a ball joint.

Thus, the foregoing descriptions of the embodiments according to the present invention are provided for illustration only, and not for the purpose of limiting the invention as defined by the appended claims and their equivalents.

What is claimed is:

1. A bicycle brake and shift operating device comprising:
   a bicycle mounting bracket;
   a brake lever pivotally connected to the mounting bracket about a first axis between a rest position and a brake operating position;
   a gear shifting mechanism attached to the mounting bracket and configured to operate a bicycle gear changing device to any one of a plurality of gear positions;
   a first gear shift member pivotally mounted relative to the bicycle mounting bracket about a second axis, the first gear shift member being connected to the gear shifting mechanism to actuate the gear shifting mechanism, the first gear shift member being arranged to actuate the gear shifting mechanism while the brake lever is in the brake operating position; and
   a connecting structure interconnecting the brake lever and the first gear shift member together such that the first gear shift member pivots about the second axis in response to the brake lever being pivoted about the first axis.

2. The bicycle brake and shift operating device as recited in claim 1, wherein
   the second axis is arranged substantially parallel to the first axis.

3. The bicycle brake and shift operating device as recited in claim 1, wherein
   the first gear shift member is configured to actuate the gear shifting mechanism by pivoting about a third axis that is not parallel to the first axis.

4. A bicycle brake and shift operating device comprising:
   a bicycle mounting bracket;
   a brake lever pivotally connected to the mounting bracket about a first axis between a rest position and a brake operating position;
   a gear shifting mechanism attached to the mounting bracket and configured to operate a bicycle gear changing device to any one of a plurality of gear positions;
   a first gear shift member pivotally mounted relative to the bicycle mounting bracket about a second axis, the first gear shift member being connected to the gear shifting mechanism to actuate the gear shifting mechanism; and
   a connecting structure interconnecting the brake lever and the first rear shift member together such that the first gear shift member pivots about the second axis in response to the brake lever being pivoted about the first axis,
   the brake lever and the first gear shift member being arranged with respect to each other in a non-contacting relationship such that the brake lever and the first gear shift member are physically separated from each other with the brake lever in both the rest position and during a pivot operation of the brake lever from the rest position to the brake operating position.

5. A bicycle brake and shift operating device comprising:
   a bicycle mounting bracket;
   a brake lever pivotally connected to the mounting bracket about a first axis between a rest position and a brake operating position;
   a gear shifting mechanism attached to the mounting bracket and configured to operate a bicycle gear changing device to any one of a plurality of gear positions;
   a first gear shift member pivotally mounted relative to the bicycle mounting bracket about a second axis, the first gear shift member being connected to the gear shifting mechanism to actuate the rear shifting mechanism; and
   a connecting structure interconnecting the brake lever and the first gear shift member together such that the first gear shift member pivots about the second axis in response to the brake lever being pivoted about the first axis,
   the connecting structure including a link member with a first end coupled to the first gear shift member and a second end movably coupled to the brake lever, the link member, the mounting bracket, the brake lever and the first gear shift member forming a four-bar linkage.

6. The bicycle brake and shift operating device as recited in claim 5, wherein
   the first end of the link member includes a ball joint and the second end of the link member includes a pivot joint, the ball joint being arranged on the third axis at least while the brake lever is arranged in the rest position, the ball joint being connected to the first gear shift member at a position different from the second axis, and the pivot joint being connected to the brake lever.

7. The bicycle brake and shift operating device as recited in claim. 1, wherein
   the gear shifting mechanism includes a winding body configured to turn such that the winding body selectively winds and releases a gear shift cable attached to the winding body; and
   the first gear shift member is configured to move the winding body in a winding direction of the gear shifting mechanism.

8. The bicycle brake and shift operating device as recited in claim 7, further comprising
   a second gear shift member connected to the gear shifting mechanism to move the winding body in a release direction, which is opposite to the winding direction.

9. The bicycle brake and shift operating device as recited in claim 2, wherein
   the first gear shift member is configured to actuate the gear shifting mechanism by pivoting about a third axis that is not parallel to the first axis.

10. The bicycle brake and shift operating device as recited in claim 4, wherein
    the second axis is arranged substantially parallel to the first axis.

11. The bicycle brake and shift operating device as recited in claim 4, wherein
    the first gear shift member is configured to actuate the gear shifting mechanism by pivoting about a third axis that is not parallel to the first axis.

12. The bicycle brake and shift operating device as recited in claim 4, wherein
    the connecting structure includes a link member with a first end coupled to the first gear shift member and a second end movably coupled to the brake lever, the link member, the mounting bracket, the brake lever and the first gear shift member forming a four-bar linkage.

13. The bicycle brake and shift operating device as recited in claim 12, wherein the first end of the link member includes a ball joint and the second end of the link member includes a pivot joint, the ball joint being arranged on the third axis at least while the brake lever is arranged in the rest position, the ball joint being connected to the first gear shift member at a position different from the second axis, and the pivot joint being connected to the brake lever.

14. The bicycle brake and shift operating device as recited in claim 4, wherein the gear shifting mechanism includes a winding body configured to turn such that the winding body selectively winds and releases a gear shift cable attached to the winding body; and the first gear shift member is configured to move the winding body in a winding direction of the gear shifting mechanism.

15. The bicycle brake and shift operating device as recited in claim 14, further comprising a second gear shift member connected to the gear shifting mechanism to move the winding body in a release direction, which is opposite to the winding direction.

* * * * *